(12) United States Patent
Niggemeier et al.

(10) Patent No.: US 8,561,501 B2
(45) Date of Patent: Oct. 22, 2013

(54) GEARBOX MOUNT BRACKET

(75) Inventors: Chris J. Niggemeier, Manchester, CT (US); Harvey C. Lee, Newington, CT (US); Zhijun Zheng, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 195 days.

(21) Appl. No.: 13/149,256

(22) Filed: May 31, 2011

(65) Prior Publication Data

US 2012/0304811 A1    Dec. 6, 2012

(51) Int. Cl.
*F16H 57/02*        (2012.01)

(52) U.S. Cl.
USPC ..................................................... 74/606 R

(58) Field of Classification Search
USPC .......... 74/606 R; 248/554; 415/213.1; 244/54
See application file for complete search history.

(56) References Cited

U.S. PATENT DOCUMENTS

| | | | |
|---|---|---|---|
| 2,650,050 A * | 8/1953 | Chandler | 248/554 |
| 4,821,980 A * | 4/1989 | Clausen et al. | 244/54 |
| 6,212,974 B1 | 4/2001 | Van Duyn | |
| 6,260,351 B1 | 7/2001 | Delano et al. | |
| 6,357,220 B1 | 3/2002 | Snyder et al. | |
| 6,547,182 B2 * | 4/2003 | Gladstone et al. | 244/54 |
| 2009/0184197 A1 * | 7/2009 | Cloft | 244/54 |
| 2009/0308972 A1 * | 12/2009 | Foster | 244/54 |
| 2010/0242496 A1 | 9/2010 | Cass et al. | |

* cited by examiner

*Primary Examiner* — Vicky Johnson
(74) *Attorney, Agent, or Firm* — Carlson, Gaskey & Olds P.C.

(57) ABSTRACT

A bracket for attaching a gearbox to an engine casing has a first portion having a first array of openings for receiving attachments therethrough, the first portion having, on a backside thereof, a first rail for engaging a slot in the engine casing, and a second portion having a second array of openings for receiving attachments therethrough. A hookup for attaching to the gearbox attaches to and in between the first portion and the second portion for diminishing effects of radial rotation between the casing and the gearbox.

22 Claims, 5 Drawing Sheets

GEARBOX MOUNT BRACKET

BACKGROUND

Gas turbine engines have a compressor for pressurizing an air stream, a combustor for burning fuel in the pressurized air to generate high energy output in the form of a hot gas stream, and a turbine, which uses a portion of the energy in the hot gas stream to drive the compressor. The remainder of the energy of the hot gas stream may be converted to a useful output by being discharged from a propulsive nozzle; by driving a turbine powering an output shaft, or by combination of both in a turbo fan engine. The powered output shaft may be used for several different purposes, for example, driving engine components such as a fuel pump and other components which are generally referred to as accessories.

A gearbox is generally used to convert the rotating power from an output shaft, which may rotating at speeds as high as 100,000 revolutions per minute in smaller engines or 8,000-10,000 revolutions per minute in larger engines, to more useful speeds.

A gearbox is particularly useful to convert the high rotational speed of an output shaft to usable speed for accessories. Gearboxes are typically mounted to an engine by means of a band encircling the engine and attaching to the gearbox.

SUMMARY

According to a first embodiment disclosed herein, a bracket for attaching a gearbox to an engine casing has a first portion having a first array of openings for receiving attachments therethrough, the first portion having, on a backside thereof, a first rail for engaging a slot in the engine casing, and a second portion having a second array of openings for receiving attachments therethrough. A hookup for attaching to the gearbox attaches to and in between the first portion and the second portion for diminishing effects of radial rotation between the casing and the gearbox.

According to a second embodiment disclosed herein, a bracket and casing assembly for mounting a gearbox to the casing has a first portion having a first array of openings for receiving attachments therethrough, the first portion having, on a backside thereof, a first rail, and a second portion having a second array of openings for receiving attachments therethrough. A hookup for attaching to the gearbox, attaches to and in between the first portion and the second portion for diminishing effects of radial rotation between the casing and the gearbox. A first mount is disposed on the casing for receiving the bracket.

The various features and advantages of the disclosed examples will become apparent to those skilled in the art from the following detailed description. The drawings that accompany the detailed description can be briefly described as follows.

DETAILED DESCRIPTION

Figure 1:
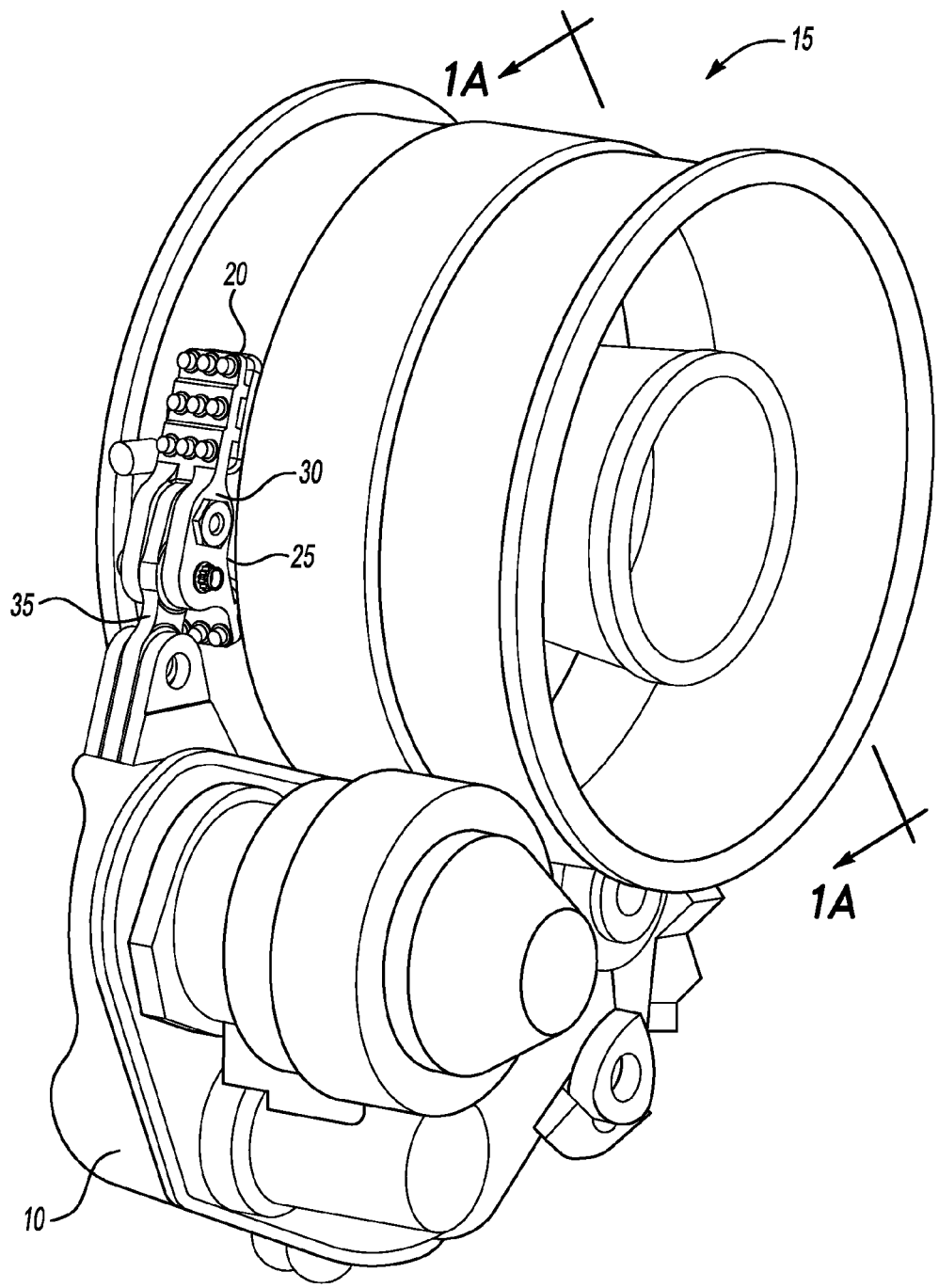
FIG. 1 shows a gearbox casing attaching to a diffuser section of a gas turbine engine.
Figure 1A:
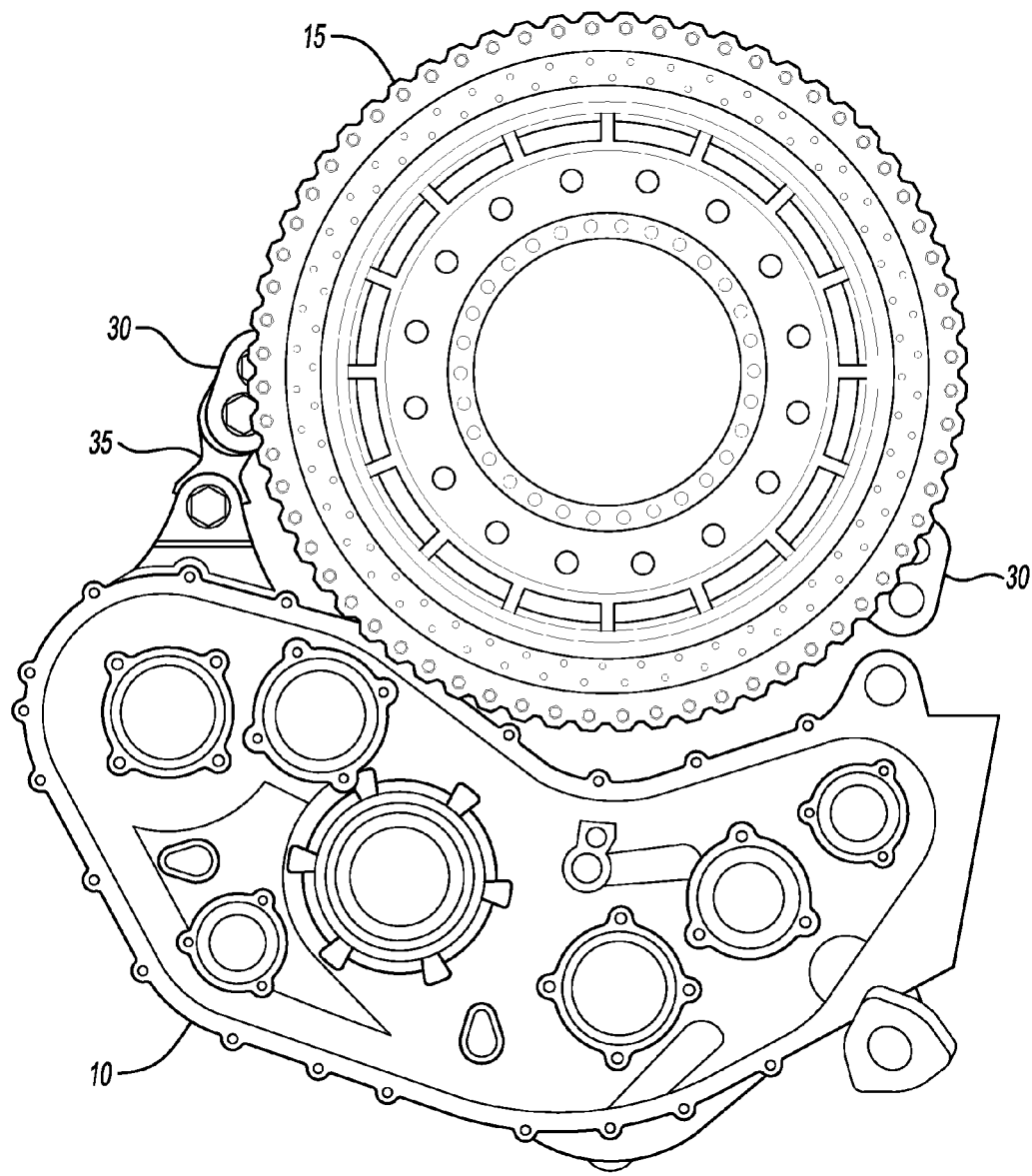
FIG. 1A shows a sectional view of the gearbox and the diffuser casing and the linkages used to mount the gearbox to the diffuser casing taken along the line 1A-1A as shown in FIG. 1.

Referring now to FIGS. 1 and 1A, a gear box 10 is attached to a gas turbine engine casing 15, such as a diffuser, though other engine casing portions may be used, by means of an upper mount 20 (see also FIGS. 2 and 3), a lower mount 25 (see also FIGS. 2 and 3), a bracket 30, and a link 35.

Figure 2:
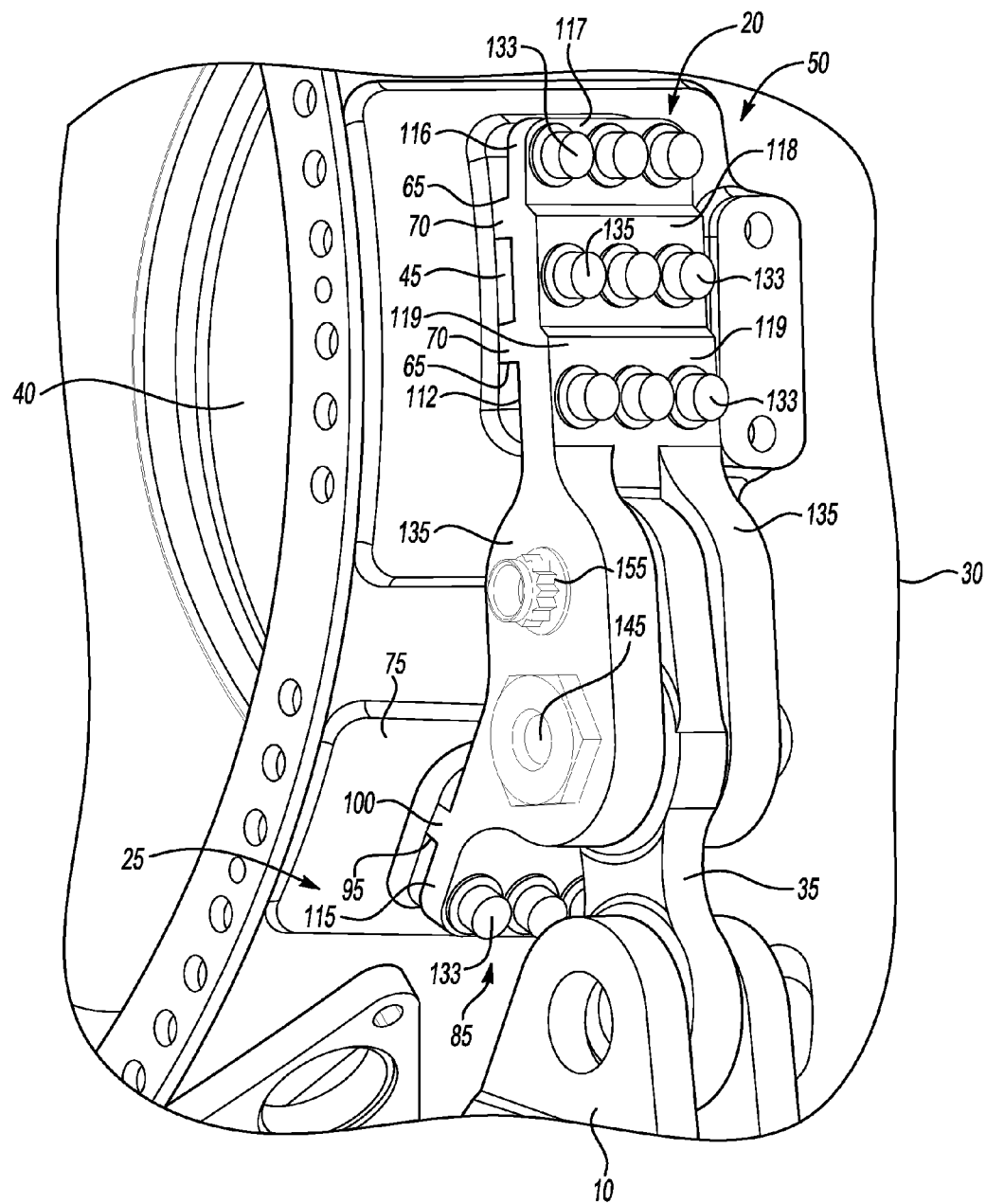
FIG. 2 shows a mount bracket 30 in accordance with a first embodiment of the invention attaching the gearbox to the diffuser casing.
Figure 3:
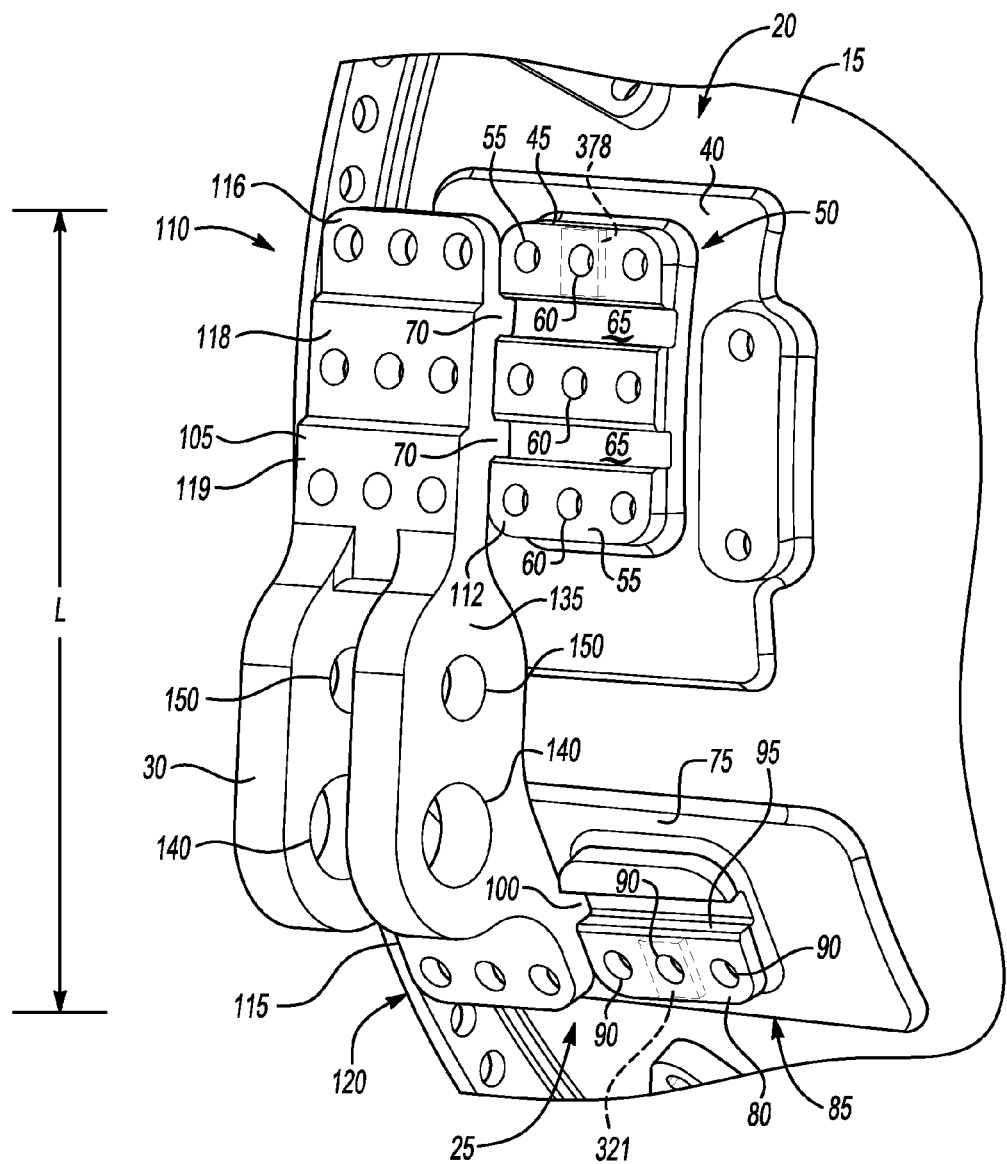
FIG. 3 shows a method of attaching a gearbox bracket 30 to the diffuser casing is contemplated herein.

Referring now to FIGS. 2 and 3, the bracket 30 and its upper and lower mount 20, 25 are shown. In this embodiment the upper mount 20 is a thickened portion of the casing 15 and has an upper first layer 40, which is generally rectangular, conforms with a curve of the casing 15, and a upper second layer 45, which extends radially outwardly from the upper first layer 40 and has a bolt hole array 50 three sets 55 of three threaded bolt holes 60. Each set 55 of bolt holes 60 is separated by a slot 65 for receiving an upper rail(s) 70 disposed on the bracket 30 as will be discussed infra.

Similarly, the lower mount 25 is a thickened portion of the casing 15 and has a lower first layer 75, which is generally rectangular, conforms with a curve of the casing 15, and a lower second layer 80, which extends outwardly from the lower first layer 75, and has a bolt hole array 85, in this case, one set of three threaded bolt holes 90. A lower slot 95 for receiving a lower rail 100 disposed on the bracket 30, is in register with the bolt hole array 85 as will be discussed infra.

Bracket 30, generally has an arcuate shape along its length L that conforms generally to the arcuate shape of the casing 15 so that connection between the casing 15 and the gearbox 10 is as close to the casing as is reasonably practicable to withstand tangential or circumferential loads on the bracket 30 that rotating machinery like gas turbine engines encounter. The bracket 30 has an upper flange 105 having a upper flange bolt hole array 110 that mates with the bolt hole array 50 in the upper second layer 45 of the upper mount 20. Moreover, the upper flange has two upper rails 70 extending from a bottom side 112 thereof that approximately mate with the slots 65 in the second layer 45 of the upper mount 20. The bracket 30 also has a lower flange 115 having a lower flange bolt hole array 120 disposed therethrough that mates with the lower bolt hole array 85 on the lower mount 25. Moreover, the lower flange 115 has a lower flange rail 130 that approximately mates with the lower slot 95 in the lower mount 25.

The upper flange 105 has a lower level 116 at an end 117 of the upper flange, a middle level 118 attaching to and extending radially higher than the lower level 116, and an upper level 119 attaching to and extending radially higher than the middle level 118 and attaching to a pair of lobes 135 as will be discussed herein. The upper flange 105 ramps upwardly through levels 116, 118 and 119 to attach to the lobes so that tangential load along the casing 15 is distributed from the lobes to the upper flange to minimize risk of breakage. The rails 70 and 100 also distribute tangential (e.g. radial) loading to the upper and lower mount 20, 25 to minimize loading on the bolts 133 that connect the bracket 30 to the upper and lower mount 20, 25.

The pair of lobes 135, which are disposed in parallel and spaced apart from each other, are mounted transversely in plane to the upper flange 105 and the lower flange 115. Each of the connecting lobes 135 has a larger hole 140 for receiving a larger bolt 145 and a smaller hole 150 for receiving a smaller bolt 155. The smaller holes 150 receive a smaller bolt 155 that acts as a fail-safe mechanism. Each of the larger holes 140 and each of the smaller holes 150 are in register with each other to receive the bolts 145, 150. The lobes 135 essentially form a hookup portion for attaching to the gearbox 10.

The link 35 has openings (not shown) that are in register with the larger hole 140 for receiving a larger bolt 145 and a smaller hole 150 for receiving a smaller bolt 155 and has other openings (not shown) to attach to the gearbox 10 by known means. One of ordinary skill in the art will recognize that the link may be an integral part of the gearbox 10.

Figure 4:
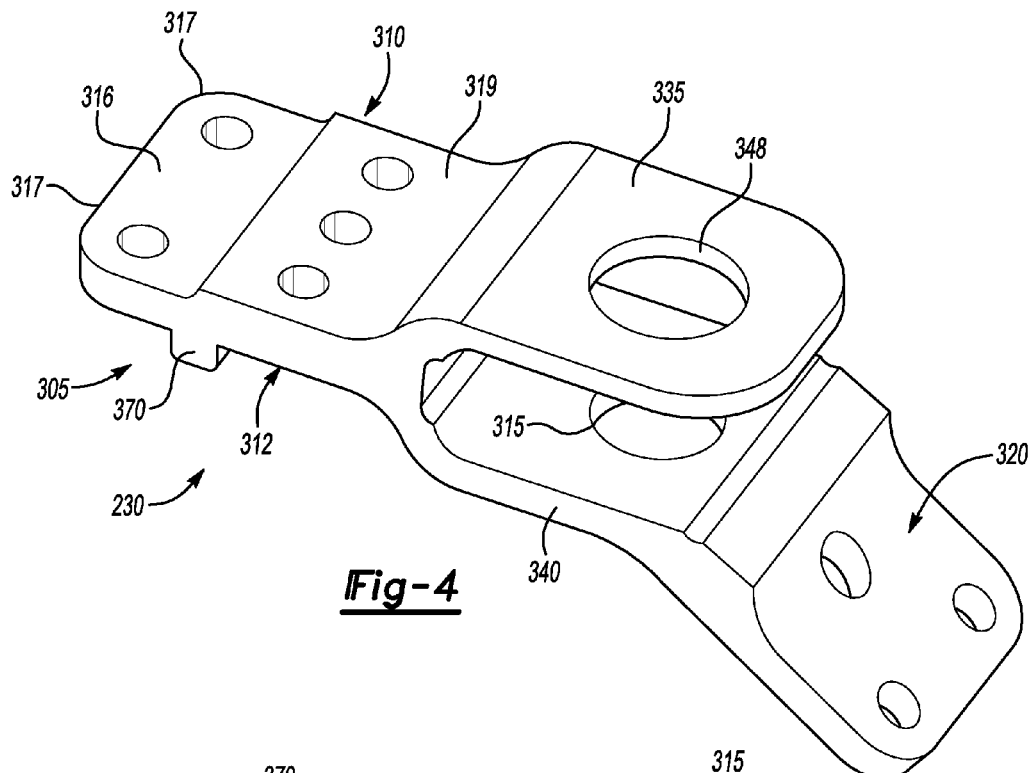
FIG. 4 shows a perspective view of a second embodiment of a gearbox bracket 30.
Figure 5:
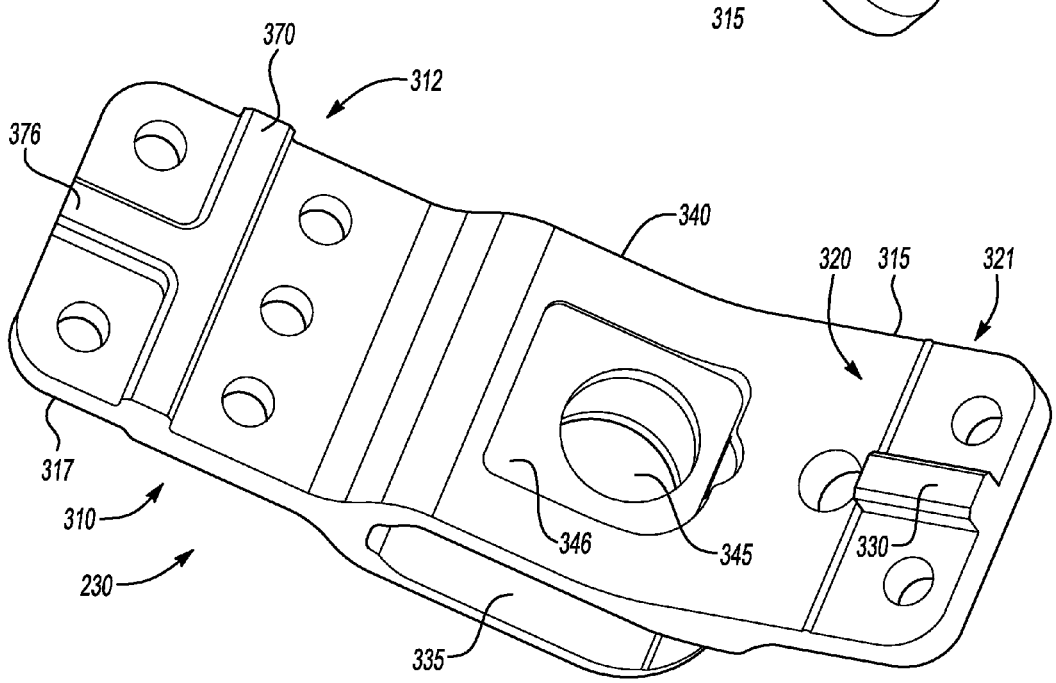
FIG. 5 shows a reverse view of the bracket of FIG. 4.

Referring now to FIGS. 4 and 5, another embodiment of a gearbox bracket 230 is shown. Bracket 230, generally has an arcuate shape along its length L that conforms generally to the arcuate shape of the casing 15 so that connection between the casing 15 and the gearbox 10 is as close to the casing as is reasonably practicable to withstand tangential and axial loads on the bracket 30 that rotating machinery like gas turbine engines encounter. The bracket 230 has an upper flange 305 having a upper flange bolt hole array 310 to mate with an identical bolt hole array (not shown) in the upper second layer 45 of the upper mount 20. Moreover, the upper flange 305 has a first rail 370 extending across and from a bottom side 312 thereof for approximately mating with a slot (not shown) in the second layer 45 of the upper mount 20. The bracket 230 also has a second rail 376 perpendicularly (at about a 90° angle) to and intersecting with the first rail 370 which engages a slot 378 (see dotted lines in FIG. 3) to minimize the effect of radial loads between the casing 15 and the gearbox 10 on bolts (not shown) used therewith.

The bracket 230 also has a lower flange 315 having a lower flange bolt hole array 320 on an outward portion 321 disposed therethrough that mates with the lower bolt hole array (not shown) on the lower mount 25. Moreover, the lower flange 315 has a lower flange rail 330 that is parallel to rail 376 and approximately mates with the lower slot (see dotted line 321 in FIG. 3) in the lower mount 25. The rails 376, 330 minimize the effect of axial loading between the casing 15 and the gearbox 10 to minimize loading on bolts (not shown).

The lower flange 315 has an inward portion 340 that angles around the casing 10 relative to the outward portion 321 to make room for a bolt head (not shown) and stay close to the casing 15 and has an opening 345 for receiving a bolt (not shown) to attaching to a link (not shown). The inward portion has an indentation 346 for receiving a bolt head (not shown) for stopping the bolt (not shown) from rotation.

The upper flange 305 has a lower level 316 at an end 317 of the upper flange and an upper level 319 attaching to and extending radially higher than the lower level 316 and attaching to the lower flange 315 and an attachment plate 335 as will be discussed herein. The upper flange 305 ramps upwardly through levels 316 and 319 to attach to the inward portion 340 of the lower flange 315 so that tangential load along the casing 15 is distributed through the bracket 230 to minimize risk of breakage. The attachment plate 335 has an opening 348 disposed therethrough.

The inward portion 340 and the attachment plate 335 are disposed in parallel and spaced apart from each other and holes 345 and 348 are in register with each other for receiving a link (not shown) connecting to the gearbox 10. The attachment plate and the inward portion essentially form a fork for receiving a link (not shown) therebetween. The inward portion 340 and the attachment plate 335 essentially form a second embodiment of a hookup portion for attaching to the gearbox 10.

There is a nominal clearance between the slot(s) 65 and the rail(s) 70, the slot 95 and the lower rail 100, the slot 378 and the rail 376, the slot (not shown) and the rail 370 and the slot 321 and the rail 330 to enable assembly therebetween. Regardless of the clearance, the rails 70, 100 and 370 within the slots 65, 95 take a load off of the bolts in a tangential (e.g., radial) direction. Also slots 378 and rail 376 and slot 321 and rail 330 take a load off of the bolts in an axial direction about the outside of the casing which enables the bolts and their attending holes to be made smaller for the intended weight loss thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims. One of ordinary skill in the art will recognize that other combinations of rails and slots may be utilized to minimize axial and radial loading.

What is claimed is:

1. A bracket for attaching a gearbox to an engine casing comprising:
   a first portion having a first array of openings for receiving attachments therethrough, said first portion having, on a backside thereof, a first rail for engaging a slot in said engine casing;
   a second portion having a second array of openings for receiving attachments therethrough; and
   a hookup for attaching to said gearbox, said hookup attaching to, and in between, said first portion and said second portion for diminishing effects of radial rotation between said casing and said gearbox, wherein said first portion has a first outer surface extending a first distance from said casing and a second outer surface extending a second distance from said casing, said second distance higher than said first distance, said second out surface attaching to said hookup.

2. The bracket of claim 1 wherein said hookup comprises:
   a pair of lobes disposed in parallel and apart from each other.

3. The bracket of claim 2 wherein each of said pair of lobes is attached transversely to each of said first portion and said second portion.

4. The bracket of claim 1 further comprising a third outer surface that is higher than said first outer surface and attaches to both the first outer surface and the second outer surface.

5. The bracket of claim 1 wherein said second portion having, on a backside thereof, a second rail for engaging a slot in said engine casing.

6. The bracket of claim 1 further comprising a second rail disposed on a backside of one of said first and said second portions, said second rail disposed perpendicularly to said first rail for diminishing an effect of axial forces between said gear box and said casing.

7. The bracket of claim 1 further comprising a second rail disposed on a backside of one of said first and said second portions for diminishing an effect of axial forces between said gear box and said casing.

8. The bracket of claim 1 further comprising an indentation on said hookup for receiving a bolt head, said indentation provided by a surface indented relative to an adjacent attachment plate surface of said hookup.

9. The bracket of claim 1 wherein said second distance is radially greater, relative to said casing, than said first distance.

10. A bracket and casing assembly for mounting a gearbox to said casing comprising:
    a first portion having a first array of openings for receiving attachments therethrough, said first portion having, on a backside thereof, a first rail;
    a second portion having a second array of openings for receiving attachments therethrough;
    a hookup for attaching to said gearbox, said hookup attaching to, and in between, said first portion and said second portion for diminishing effects of radial rotation between said casing and said gearbox; and
    a first mount disposed on said casing for receiving said bracket, said first mount including a first slot, said first rail received in said first slot.

11. The assembly of claim 10 wherein said first mount comprises:
    a first layer machined into said casing.

12. The assembly of claim 11 wherein said first mount further comprises a second layer extending radially outwardly from said casing.

13. The assembly of claim 12 wherein second layer has a first array of holes to register with said first array of openings for receiving said attachments therethrough.

14. The assembly of claim 12 wherein said second layer has said first slot.

15. The assembly of claim 14 wherein said second layer has a second slot, said second slot receiving a second rail disposed on said backside of said first portion, wherein said second rail is disposed at an angle to said first rail.

16. The assembly of claim 15 wherein said angle is about 90 degrees.

17. The assembly of claim 16 wherein said second layer has a third slot for receiving a third rail disposed on said backside of said second portion, wherein said second rail is disposed at an angle of about 90 degrees to said third rail.

18. The assembly of claim 14 wherein said second layer has a third slot for receiving a third rail disposed on said backside of said second portion, wherein said second rail is disposed at an angle of about 90 degrees to said third rail.

19. The assembly of claim 10 further comprising a second mount.

20. The assembly of claim 19 wherein said second mount includes a first layer extending from said casing and a second layer extending radially outwardly from said first layer.

21. The assembly of claim 19 wherein second mount has a second array of holes in register with said second array of openings for receiving said attachments therethrough.

22. The assembly of claim 19 wherein said second mount has a second slot, said second slot receiving a second rail.

\* \* \* \* \*